US 9,001,699 B2

(12) United States Patent
Meghani et al.

(10) Patent No.: US 9,001,699 B2
(45) Date of Patent: Apr. 7, 2015

(54) SYSTEMS AND METHODS FOR COMMUNICATION SETUP VIA RECONCILIATION OF INTERNET PROTOCOL ADDRESSES

(76) Inventors: Jaya Meghani, Old Bridge, NJ (US); Chakrapani Gorrepati, Morganville, NJ (US); Binou Zhu, Morganville, NJ (US); Guy Fighel, Red Bank, NJ (US)

(*) Notice: Subject to any disclaimer, the term of this patent is extended or adjusted under 35 U.S.C. 154(b) by 57 days.

(21) Appl. No.: 13/337,212

(22) Filed: Dec. 26, 2011

(65) Prior Publication Data
US 2013/0163476 A1 Jun. 27, 2013

(51) Int. Cl.
H04L 12/16 (2006.01)
H04L 29/06 (2006.01)
H04M 3/436 (2006.01)

(52) U.S. Cl.
CPC .......... H04L 65/103 (2013.01); H04L 65/1046 (2013.01); H04L 65/1069 (2013.01); H04L 65/1076 (2013.01); H04M 3/436 (2013.01)

(58) Field of Classification Search
USPC .......................................... 370/259; 709/225
See application file for complete search history.

(56) References Cited

U.S. PATENT DOCUMENTS

| | | | |
|---|---|---|---|
| 2006/0212572 A1* | 9/2006 | Afek et al. | 709/225 |
| 2007/0073660 A1* | 3/2007 | Quinlan | 707/3 |
| 2007/0230348 A1* | 10/2007 | Zhong | 370/235 |
| 2008/0307524 A1* | 12/2008 | Singh et al. | 726/22 |
| 2011/0258691 A1* | 10/2011 | Izatt | 726/11 |
| 2012/0027191 A1* | 2/2012 | Baril et al. | 379/210.02 |
| 2013/0145465 A1* | 6/2013 | Wang et al. | 726/23 |

* cited by examiner

Primary Examiner — Albert T Chou
(74) Attorney, Agent, or Firm — Nixon & Vanderhye, P.C.; Joseph Pagnotta

(57) ABSTRACT

Systems and methods for forwarding data packets to facilitate an IP telephony communication make use of a media relay to accomplish the forwarding actions. The media relay is configured receive setup signaling indicating a first acceptable originating IP address for received data packets. The media relay also allows the acceptable originating IP address to change once after the initial call setup has occurred. Also, if a REINVITE action occurs during a call, the media relay will allow the acceptable originating IP address to change once after the REINVITE signaling has been completed.

13 Claims, 6 Drawing Sheets

SYSTEMS AND METHODS FOR COMMUNICATION SETUP VIA RECONCILIATION OF INTERNET PROTOCOL ADDRESSES

FIELD OF THE INVENTION

The invention is related to systems and methods for controlling how and when a media relay forwards data packets bearing the media of a Voice over Internet Protocol (VoIP) telephony communication. The invention is also related to systems and methods for preventing fraudulent use of a media relay.

BACKGROUND OF THE INVENTION

When an Internet Protocol (IP) telephony system establishes a VOIP telephone call between a calling telephony device and a called telephony device, it is common for data packets bearing the call setup signaling to traverse a first path between the calling telephony device and the called telephony device, and for data packets bearing the media of the call to traverse a second path between the calling telephony device and the called telephony device. Often, the IP telephony system will designate a media relay that is in direct communication with the calling and called telephony devices to pass data packets bearing the media back and forth between the calling and called telephony devices.

When a media relay is used to help communicate the data packets bearing the media of a call, the IP telephony system designates a specific port of the media relay for this purpose. The call setup signaling sent to the calling and called telephony devices informs the calling and called telephony devices of the IP address and designated port of the media relay so that the calling and called telephony devices know where to send data packets bearing the media of the call. Once the call commences, the designated port of the media relay receives data packets from the called telephony device and forwards those packets to the called telephony device, and vice versa.

If the IP telephony system could ensure that the data packets bearing the media of the call would be sent from the same IP addresses as the call setup signaling used to initiate the call, then the IP telephony system could simply inform the media relay of those IP addresses. The specified port of the media relay could then receive and forward data packets sent only from those specified IP addresses, and the specified port of the media relay could ignore any other data packets that arrive from other alternate IP addresses. This would prevent a hacker from fraudulently using the media relay.

Unfortunately, it is possible for some telephony devices to establish two independent communication sessions, a first for data packets bearing the call setup signaling, and a second for the data packets bearing the media of the call. Those two communication sessions can originate from different IP addresses. Because of this fact, the media relay cannot afford to simply ignore data packets that originate from a different IP address than the call setup signaling. If the media relay operated in that fashion, the media relay might be ignoring the data packets bearing the media of the call. Accordingly, the call would fail.

For example, the calling telephony device could be a mobile telephony device that accesses a data network via a cellular service provider. In many instances, it is possible for a single mobile telephony device to be conducting multiple communication sessions via data channels provided by the cellular service provider, and for each communication session to be assigned a different temporary IP address. Thus, the mobile telephony device could end up sending the call setup signaling via a first communications channel having a first IP address, and for the mobile telephony device to communicate the media of the call via a second communications channel having a second IP address.

In another instance, a call may be setup through a first communications card within a proxy server or a gateway. If the call is put on hold, the proxy server or gateway may release the resources originally used to conduct the call so that those resources can be used for other calls. When the call is taken off hold, the call may be assigned to a new card within the proxy server or gateway, and the new card would have a different IP address. Thus, when the call begins, data packets bearing the call setup signaling and the media of the call may originate from a first IP address. But partway through the call, data packets bearing the media of the call may begin to originate from a second, different IP address.

In still other instances, a mobile telephony device may be present in a location where it can establish communication sessions with multiple wireless access points. This would allow the mobile telephony device to establish two wireless data connections, one through a first wireless access point having a first IP address, and a second through a second wireless access point having a second IP address. In this instance, the mobile telephony device might use the first wireless data connection to communicate the call setup signaling for a call, and then use the second wireless data connection to communicate data packets bearing the media of the call.

Additionally, if media relays are configured so that they are willing to forward any data packets they receive, regardless of the originating IP address, the media relays would be subject to abuse from hackers. Once a hacker learns the IP address and one or more port numbers of such a media relay, the hacker could cause the media relay to forward data traffic without paying for the service. To prevent this type of abuse, many companies that operate or use media relays create blacklists of originating IP addresses that are assumed to be bad actors. If a media relay receives a data packet having an originating IP address that is on the blacklist, the data packet is discarded.

While the use of blacklists is helpful in preventing fraud and abuse of media relays, the blacklists are never completely comprehensive. Also, hackers can avoid this countermeasure by constantly shifting the originating IP addresses they use to communicate data packets. As soon as a hacker learns that a first originating IP address has been added to a blacklist, the hacker simply shifts to a different originating IP address.

There is a need for systems and methods of preventing fraudulent uses of media relays that also allow for data packets bearing the media of a call to originate from a different IP address than data packets bearing the call setup signaling. Preferably, such systems and methods will also allow the originating IP address of the data packets bearing the media of a call to change partway through the call, if there are valid reasons for such a change.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using data over a packet-based data network. Signaling that is conducted in the packet-based data network is preferably executed using Session Initiation Protocol (SIP). SIP is a popular communication protocol for initiating, managing and terminating media (e.g., voice, data and video) sessions across packet-based data networks that typically use the Internet Protocol (IP), of which Voice Over Internet Protocol (VOIP) is an example. The details and functionality of SIP can be found in the Internet Engineering Task Force (IETF) Request for Comments (RFC) Paper No. 3261 entitled, "SIP: Session Initiation Protocol" herein incorporated in its entirety by reference.

SIP establishes and negotiates a session, including the modification or termination of a session. It uses a location-independent address system feature in which called parties can be reached based on a party's name. SIP supports name mapping and redirection, allowing users to initiate and receive communications from any location. Of course, while SIP is a preferred protocol for establishing communications over a data network, other signaling protocols could also be used to perform the invention.

Figure 1:
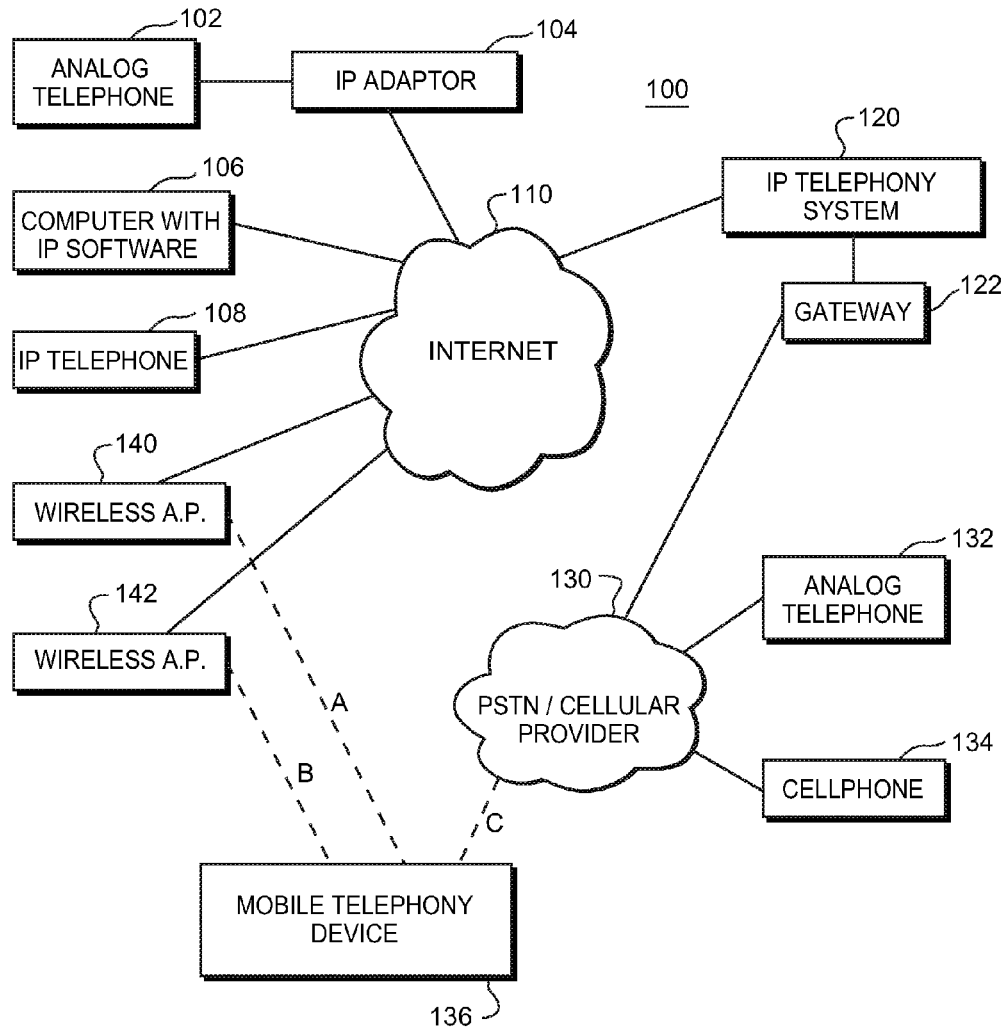
FIG. 1 is a block diagram of a communication environment which can be used to provide telephony communications.

FIG. 1 illustrates a communications environment 100 that facilitates IP enhanced communications. An IP telephony system 120 enables connection of telephone calls and other telephony communications between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize an analog telephone 102 which is connected to the Internet 110 via an IP adapter 104. The IP adapter 104 converts analog signals from the telephone 102 into data signals that pass over the Internet 110, and vice versa. Analog telephone devices include, but are not limited to, standard telephones and document imaging devices such as facsimile machines. A configuration using an IP adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to an IP adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to conduct an IP telephone call or some other form of communication. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the Apple iPhone™, that includes both cellular telephone capabilities and a wireless data transceiver that can establish a wireless data connection to a data network. Such a mobile computing device could run appropriate application software to conduct IP communications calls via a wireless data connection. Thus, a mobile computing device, may also include RIM Blackberry™ or comparable devices running Google's Android operating system.

In still other instances, a mobile telephony device may be a device that is not traditionally used as a telephony device, but which includes a wireless data transceiver that can establish a wireless data connection to a data network. Such a device may act as a mobile telephony device once it is configured with appropriate application software.

FIG. 1 illustrates that a mobile telephony 136 is capable of establishing a first wireless data connection A with a first wireless access point 140, such as a WiFi or WiMax router. The first wireless access point 140 is coupled to the Internet 110. Thus, the mobile telephony device 136 can establish a VOIP telephone call with the IP telephony system 120 via a path through the Internet 110 and the first wireless access point 140.

FIG. 1 also illustrates that the mobile telephony device 136 can establish a second wireless data connection B with a second wireless access point 142 that is also coupled to the Internet 110. Further, the mobile telephony device 136 can establish one or more wireless data connections C via a data channel provided by a cellular service provider 130 using its cellular telephone capabilities. The mobile telephony device 136 is also capable of establishing multiple independent communication sessions with the cellular service provider 130, and each independent communication session could be assigned a different temporary IP address.

Figure 2:
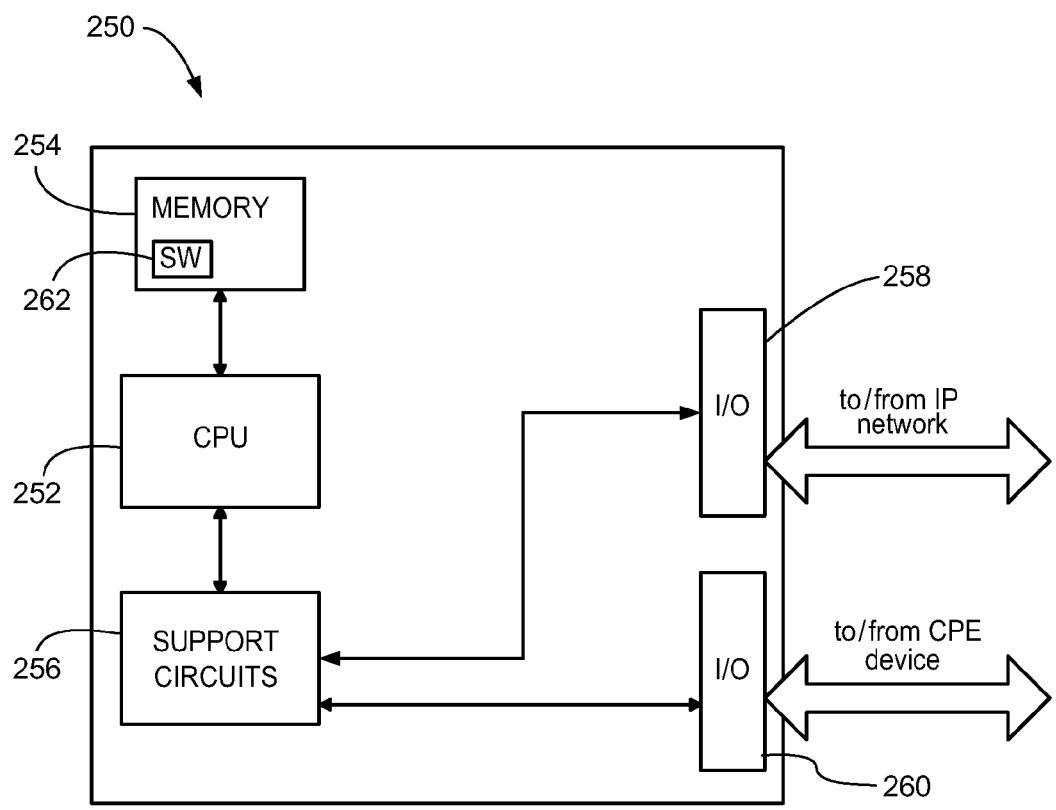
FIG. 2 is a schematic diagram of a controller that may be used to practice one or more embodiments of the present invention.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the VOIP based telephony service 120. Further, a mobile telephony device 136 or some other IP telephony device could make use of one or more of the processors 250 to accomplish various functions.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment and to service provider agent equipment, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120, or a mobile telephony device. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture The following description refers to IP telephony communications, or simply telephony communications. This phrase is intended to encompass any type of communication, including voice or video telephone calls, text messages and other forms of text-based or video-based messaging, as well as other forms of communications. Although the following examples may refer to a "call" or a "telephone call," for ease of reference, clarity and brevity, the systems and methods described may also be used to accomplish other forms of communications.

Figure 3:
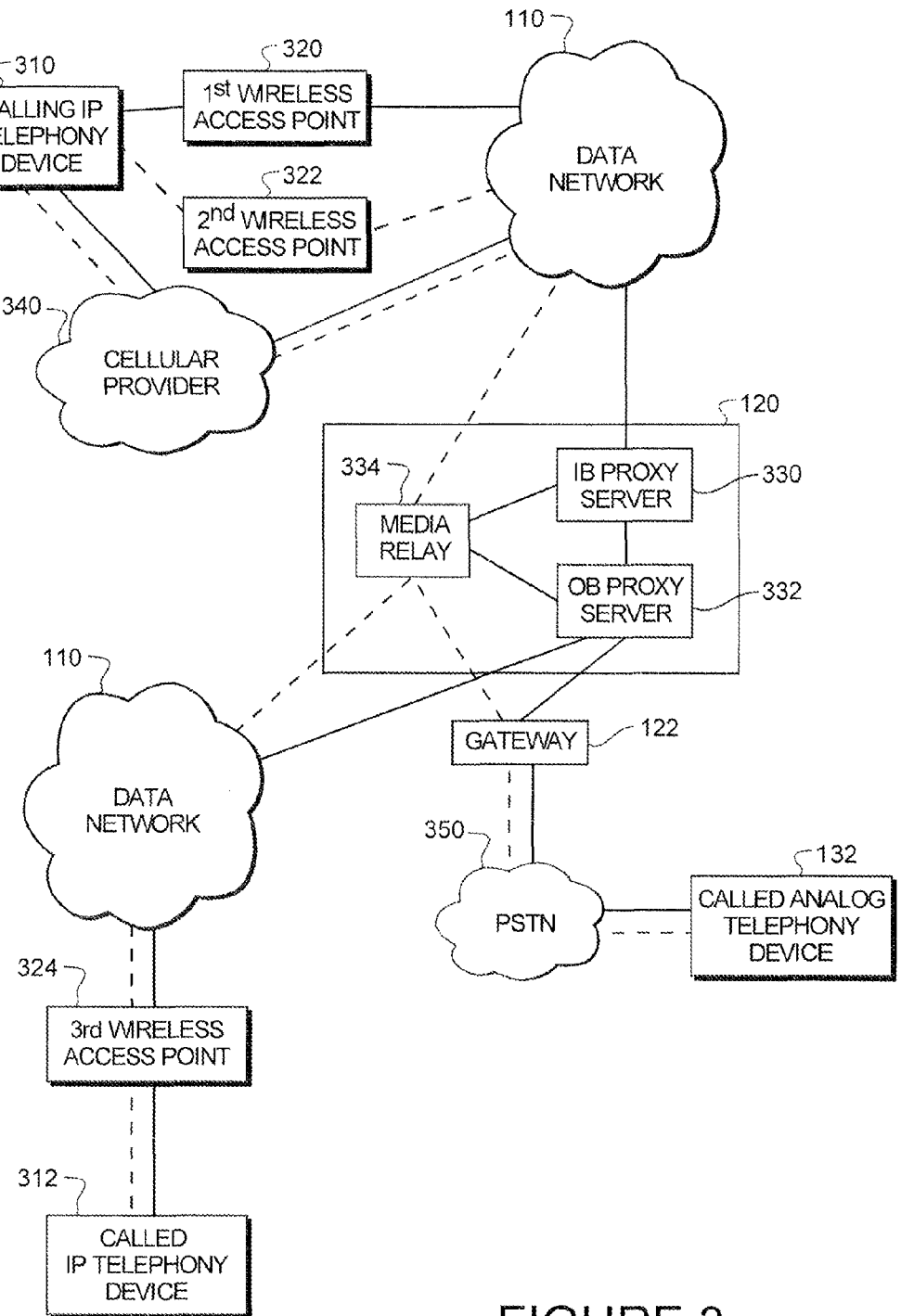
FIG. 3 is a block diagram illustrating elements of a communications environment that can provide IP telephony communications in accordance with embodiments of the invention.

FIG. 3 illustrates one embodiment of how a call is connected between a calling IP telephony device 310 and a called analog telephony device 132 utilizing a media relay. The following description explains how data packets bearing call setup signaling may traverse a different path than data packets bearing the media of the call, and why those data packets may originate from different IP addresses. The following description also explains how systems and methods embodying the invention can prevent fraudulent use of a media relay, while still allowing the data packets bearing the media of the call to originate from a different IP address than the data packets bearing the call setup signaling.

In FIG. 3, the paths traversed by data packets bearing call setup signaling are illustrated by solid lines. Conversely, the paths traversed by data packets bearing the media of a call are illustrated by dashed lines.

When the user of the calling IP telephony device 310 dials the telephone number of the called analog telephony device 132, call setup signaling is transmitted to the IP telephony system 120 via the data network 110. In this embodiment, the call setup signaling passes through a first data channel established between the calling IP telephony device 310 and the data network 110 through the first wireless access point 320. The call setup signaling is received by an inbound proxy server 330 of the IP telephony system 120.

The inbound proxy server 330 of the IP telephony system 120 consults with routing elements (not shown) of the IP telephony system 120 to determine the identity of an outbound proxy server 332 that can be used to setup the call to the called analog telephony device 132. The routing elements of the IP telephony system also identify a media relay 334 that can be used to facilitate the communication of data packets bearing the media of the call.

The inbound proxy server 330 sends call setup signaling to the outbound proxy server 332, and the outbound proxy server 332 communicates with a gateway 122. The gateway 122 provides an interface to a PSTN 350 that provides service to the called analog telephony device 132. The call setup signaling traverses a path through the outbound proxy server 332, the gateway 122, and the PSTN 350 to arrive at the called analog telephony device 132.

The inbound proxy server 330 and possibly the outbound proxy server 332 send call setup signaling to the media relay 334 to inform the media relay 334 that it will be used to help communicate data packets bearing the media of the call. This call setup signaling will reserve a particular port of the media relay 334 for this purpose. The call setup signaling will also identify the IP address from which the call setup signaling originated, which in this case is the IP address of the first wireless access point 320. The call setup signaling may also identify the IP address which is used to communicate with the called analog telephony device 132, which in this case would be the IP address of the gateway 122.

The inbound proxy server 330 also sends call setup signaling back to the calling IP telephony device 310 to inform the calling IP telephony device 310 of the IP address and port number of the media relay 334. As a result, the calling IP telephony device 310 knows where to send data packets bearing media of the call. Similar information is also communicated to the gateway 122.

If the called party answers the call, data packets bearing the media of the call will begin to be exchanged between the calling IP telephony device 310 and the gateway 122. Data packets bearing the media of the call that originate from the calling IP telephony device 310 travel through a second wireless data connection between the calling IP telephony device 310 and the data network 110 that passes through the second wireless access point 322, as illustrated by the dashed line. The data packets are then communicated directly to the media relay 334. The media relay 334 forwards the data packets directly to the gateway 122, and the gateway 122 converts the data packets to analog signals that are passed to the PSTN 350.

Likewise, when the gateway 122 receives analog signals from the PSTN 350 representing audio generated by the called party via the called analog telephony device 132, the gateway 122 generates data packets bearing the media of the call, and those data packets are sent directly to the media relay 334. The media relay 334 forwards the data packets to the second wireless access point 322 via the data network 110, and the second wireless access point 322 delivers the data packets to the calling IP telephony device 310.

Because of the call setup signaling received by the media relay 334, the media relay 334 knows the originating IP address of the first wireless access point 320, which is where the call setup signaling originated. Likewise, the media relay 334 knows the originating IP address of the gateway 122, which is used to communicate with the called analog telephony device 132. Under normal circumstances, the calling IP telephony device 310 sends data packets bearing the media of the call through the same wireless access point, which would mean that the data packets bearing the media of the call would have the same originating IP address as the data packets bearing the call setup signaling. However, in this embodiment, the data packets bearing the media of the call are instead originating from a different IP address, specifically from the IP address assigned to the second wireless access point 322. Thus could occur for any of the reasons discussed above in the background section, and for other reasons.

Under these circumstances, if the media relay 334 were to ignore all received data packets that do not originate from the first wireless access point 320, the call will fail. To make the call work, it is necessary for the media relay 334 to receive and forward data packets that originate from the IP address of the second wireless access point 322. Up to this point, the media relay has no way of knowing the IP address of the second wireless access point 322.

In systems and methods embodying the invention, the media relay 334 is configured to allow a single switch to occur in the originating IP address of the data packets bearing the media of the call after the call setup signaling has been received from the inbound proxy server 330. When the calling IP telephony device 310 begins sending data packets bearing the media of the call to the identified port of the media relay 334, via the second wireless access point 322, those data packets will have the originating IP address of the second wireless access point 322. When this occurs, the media relay 334 will change the acceptable originating IP address for the call from the IP address of the first wireless access point 320 to the IP address of the second wireless access point 322, which is reflected in the data packets it is receiving from the calling IP telephony device 310. The media relay 334 will also record the fact that there has been a single change in the acceptable originating IP address for data packets relating to this call.

From this point on, the assigned port of the media relay 334 will accept and forward data packets having the originating IP address of the second wireless access point 322. But the media relay 334 will refuse to forward data packets that originate from any other IP address. For this reason, if a hacker sends data packets to the assigned port of the media relay 334 from some other originating IP address, the data packets will be discarded. Allowing a single change to the acceptable originating IP address for the data packets bearing the media of the call ensures that data packets sent from the calling IP telephony device 310 via a second wireless data connection (which is different from a first wireless data connection used to communicate the original call setup signaling) will still be forwarded on to the called telephony device. However, because only a single change in the originating IP address can occur, hackers are prevented from fraudulently using the media relay.

As mentioned above in the background section, when a mobile telephony device utilizes a cellular service provider to communicate data, the cellular service provider may set up multiple communication sessions with the mobile telephony device, and a different temporary IP address may be assigned to each of the communication sessions. FIG. 3 also illustrates this scenario.

As shown in FIG. 3, the calling IP telephony device 310 (which can be a mobile telephony device) establishes a connection to the data network 110 through a cellular service provider 340. The cellular service provider 340 establishes two communication sessions with the calling IP telephony device 310, and a different IP address is assigned to each communication session. From the perspective of the IP telephony system 120, data packets bearing the call setup signaling, which is represented by the solid line, appear to originate from a first IP address, whereas data packets bearing the media of the call, which is represented by the dashed line, appear to originate from a second, different IP address.

As with the first scenario described above, during call setup, the inbound proxy server 330 informs the media relay 334 to expect to receive data packets bearing the media of the call from the first IP address assigned by the cellular service provider 340 for the path that bore the call setup signaling. However, when the calling IP telephony device 310 begins to send data packets bearing the media of the call, the data packets will appear to originate from the second IP address assigned by the cellular service provider 340 to the second communication session. The media relay 334 adjusts its settings so that the acceptable originating IP address for the call corresponds to the second IP address assigned by the cellular service provider 340. The media relay 334 also registers the fact that a single change to the originating IP address has occurred. As a result, data packets received from the second IP address will still be forwarded to gateway 122. Also, from this point on the media relay 334 will not allow any further changes to the acceptable originating IP address. Data packets originating from any other IP addresses will be discarded.

In the examples described above, the called telephony device was an analog telephony device 132 that is provided with service by a PSTN 350. FIG. 3 also illustrates that the called telephony device could also be an IP telephony device 312.

In the alternate embodiment illustrated in FIG. 3, the called IP telephony device 312 is a mobile IP telephony device that establishes a data connection to a data network 110 through a third wireless access point 324. When a call is first setup between the calling IP telephony device 310 and the called IP telephony device 312, call setup signaling is routed from the inbound proxy server 330 and the outbound proxy server 332 of the IP telephony system 120 to the called IP telephony device 312 via the third wireless access point 324. Data packets bearing the media of the call are routed through the media relay 334 of the IP telephony system 120 directly to the third wireless access point 324, which delivers the data packets to the called IP telephony device 312. Likewise, data packets bearing the media of the call that are generated by the called IP telephony device 312 are routed through the third wireless access point 324 directly to the media relay 334 via the data network 110. Thus, data packets bearing the media of the call and data packets bearing the call setup signaling are routed to and from the called IP telephony device via the same wireless data connection to the called IP telephony device 312.

During call setup, the media relay 334 is informed of the IP address of the third wireless access point 324, from which call setup signaling from the called IP telephony device 312 originates. The media relay 334 would be instructed to expect to receive data packets bearing the media of the call and sent from the called IP telephony device 312, where those data packets have the originating IP address of the third wireless access point 324. Because the called IP telephony device 312 communicates both call setup signaling and media through the third wireless access point 324, this information would be accurate.

However, if the called IP telephony device 312 used a separate data connection having a separate IP address to communicate data packets bearing the media of the call, the media relay 334 would allow a single change to the originating IP address for those data packets. Thus, the media relay 334 allows a single change in the originating IP address to occur for data packets going in both directions.

Another action would could potentially cause difficulty with this type of a system is when a SIP REINVITE action occurs. A REINVITE action can occur when a call is established to a telephony device via a first path, and where the path changes partway through the call. This could occur if a mobile telephony device is moving, and it moves out of range of a first wireless access point and into range of a second wireless access point. When this occurs the call would be switched from the first wireless access point to the second wireless access point partway through the call. Because the wireless access points have different IP addresses, the originating IP address of the data packets sent from the IP telephony device would change partway through the call. Likewise, data packets that are to be sent to the IP telephony device must be addressed to a different IP address after the transition occurs. A SIP REINVITE action accommodates this situation.

The call signaling that occurs during a REINVITE action informs all relevant parties of the change in the IP address being used by the mobile telephony device. During a REINVITE action, the media relay 334 would be informed of the new originating IP address of the mobile telephony device. Specifically, the media relay 334 would be informed of the new address used by the mobile telephony device to communicate the signaling associated with the REINVITE action.

If the mobile telephony device is using two separate data connections having two different IP addresses, a first for call signaling and a second for media, then data packets bearing the media of the call that are sent from the mobile telephony device after a REINVITE action will appear to originate from a different IP address than the data packets bearing the REINVITE signaling. For this reason, the media relay 334 is also configured to allow a single change in the acceptable originating IP address to occur for data packets bearing the media of the call after each REINVITE action. As with original call setup, this is necessary to allow the mobile telephony device to send data packets bearing the media of the call via a different data connection (having a different IP address) than the data packets bearing the REINVITE signaling.

Figure 4:
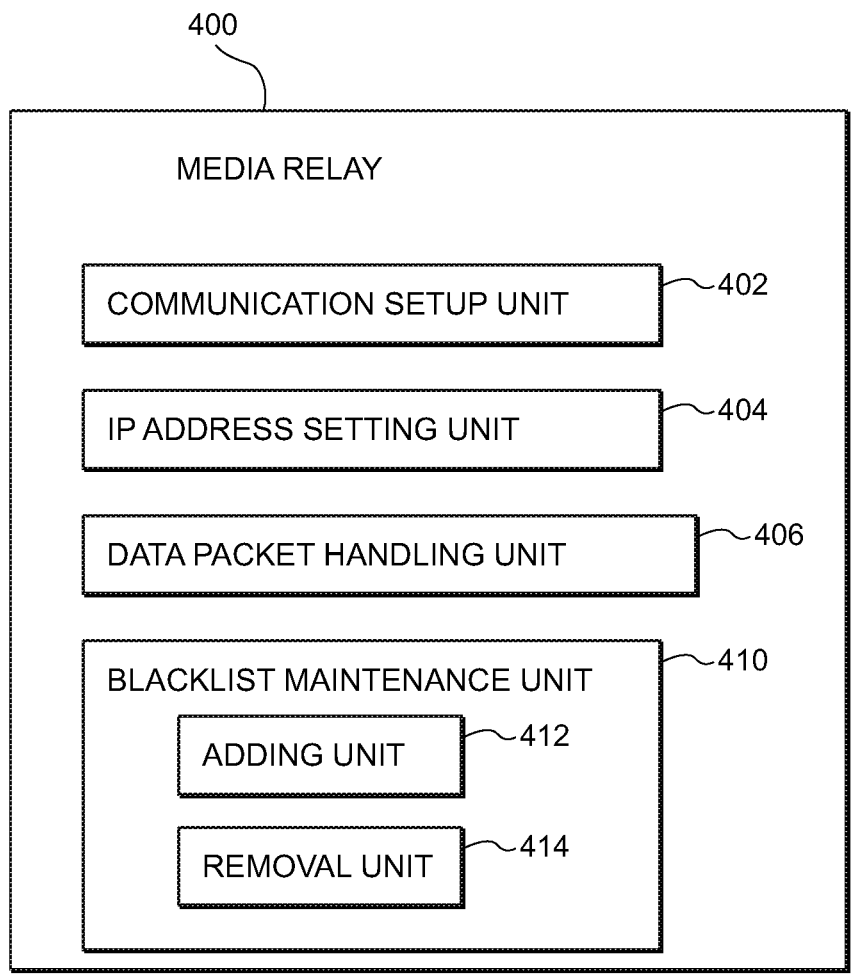
FIG. 4 is a block diagram illustrating elements of a media relay embodying the invention.

FIG. 4 illustrates some of the elements that are present in a media relay 400 configured in accordance with the invention. The media relay 400 includes a communication setup unit 402 which handles call setup signaling sent from a proxy server or other elements of the IP telephony system 120. The communication setup unit 402 reserves a particular port of the media relay 400 for use in communicating data packets bearing the media of a call.

The media relay 400 also includes an IP address setting unit 404. The IP address setting unit 404 identifies the acceptable originating IP addresses from which a particular port of the media relay 400 will receive and forward data packets bearing the media of a call. When a call is first being setup, the IP address setting unit 404 sets the acceptable originating IP addresses to the IP addresses from which call setup signaling was received from the calling and called telephony devices. However, as explained above, the IP address setting unit 404 may reset those respective acceptable originating IP addresses one time after call setup (or a REINVITE action) has occurred. The IP address setting unit 404 tracks the number of times that the acceptable originating IP address has changed. If the acceptable originating IP address has changed one time after call setup or a REINVITE action has occurred, the IP addressing setting unit 404 prevents further changes.

The media relay 400 also includes a data packet handing unit 406. The data packet handling unit 406 receives incoming data packets and forwards those data packets to the proper destination under the proper circumstances. As explained above, if a received data packet has an originating IP address that is valid, according to the IP address setting unit, the data packet handling unit 406 forwards the data packet to the appropriate destination. If a received data packet has an originating IP address that is not valid, according to the IP address setting unit 404, the data packet handling unit discards the data packet.

FIG. 4 also illustrates that the media relay 400 includes a blacklist maintenance unit 410. The blacklist maintenance unit 410 includes an adding unit 412 that adds originating IP addresses to a blacklist, and a removal unit 414 that removes originating IP addresses from a blacklist. Some of the reasons for adding an originating IP address to a blacklist are discussed above. Some of the reasons for removing an IP address from a blacklist are discussed below.

Figure 5:
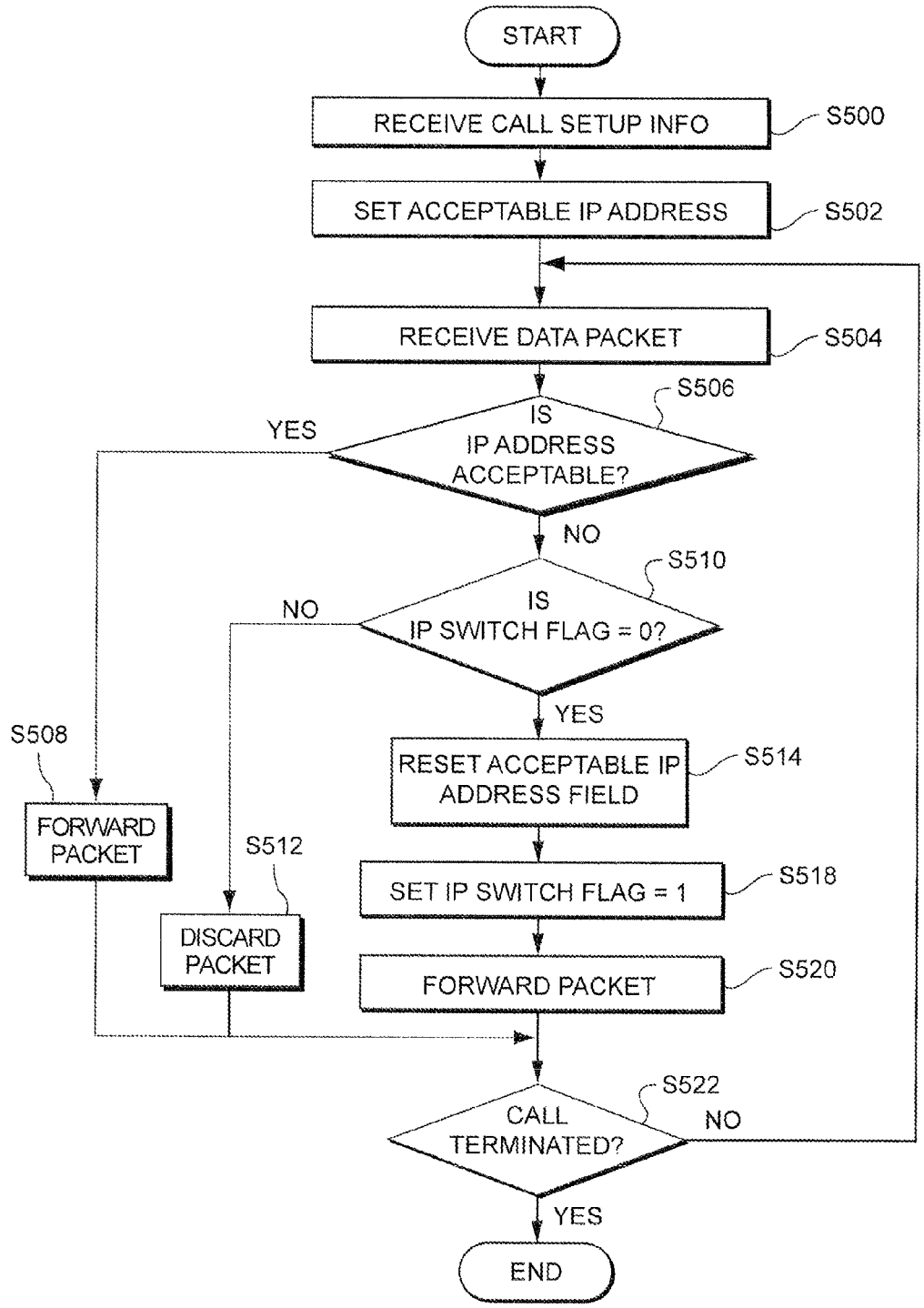
FIG. 5 is a flowchart illustrating steps of a first method embodying the invention.

FIG. 5 illustrates steps of a first method embodying the invention that would be performed by a media relay embodying the invention. The method begins in step S500, when the communication setup unit 402 of a media relay 400 receives call setup information. As explained above, the call setup information could include an indication of which port of the media relay is to be used to communicate data packets bearing the media of a call. The call setup information also indicates the originating IP address of the data packets bearing the call setup signaling that were sent from the calling telephony device. In some embodiments, the call setup information may also indicate the originating IP address of the data packets bearing call setup signaling sent from the called telephony device.

In step S502, the IP address setting unit 404 sets the initial acceptable originating IP addresses for data packets bearing the media of the call which are to be sent from the calling and called telephony devices. The initial acceptable originating IP addresses are identical to the originating IP addresses of the call setup signaling received from the calling and called IP telephony devices. Also, during step S502, an IP address switch flag is set to zero for both the calling telephony device and the called telephony device. An IP address switch flag is tracked separately for each of the calling and called telephony devices.

In step S504, the media relay receives a first data packet bearing the media of the call from one of the calling and called telephony devices. In step S506, the data packet handling unit 406 checks to determine if the originating IP address of the data packet matches the acceptable originating IP addresses set for that telephony device. If so, the method proceeds to step S508, and the data packet is forwarded to the appropriate destination.

If the check performed in step S506 reveals that the originating IP address of the data packet does not match the relevant initial acceptable originating IP address, the method proceeds to step S510, where a check is performed to determine if the relevant IP address switch flag is set to zero. If the IP address switch flag is set to zero, this means that the originating IP address for the device that forwarded the data packet has not changed since the call setup first occurred. If this is the case, the method proceeds to step S514, wherein the IP address setting unit 404 re-sets the acceptable originating IP address for the telephony device that sent the data packet to the originating IP address of the received data packet. Next, in step S518, the IP address switch flag for that telephony device is set to one, which indicates that a first change in the acceptable originating IP address for that telephony device has occurred. Then, in step S520, the data packet handling unit 406 forwards the data packet to the appropriate destination.

If the check made in step S510 indicates that the IP address switch field is not zero, this would indicate that the acceptable originating IP address for the telephony device that sent the data packet has already been changed one time since call setup occurred. Because the check made in step S506 indicated that the originating IP address of the data packet did not match the acceptable originating IP address set for this telephony device, the method would proceed to step S512, and the data packet would be discarded.

Regardless of the path traveled to reach step S522, in step S522, the media relay would check to determine if the call has been terminated. If not, the method would loop back to step S504, where another data packet would be received.

A method as described above, when performed by a media relay, will allow a single change in the originating address for data packets sent from both the calling telephony device and the called telephony device. However, if data packets are received from any other IP addresses, the media relay will discard the data packets.

A media relay embodying the invention may also make use of blacklists to prevent hackers from making fraudulent use of the media relay. A blacklist identifies originating IP addresses that are considered suspect. If a media relay receives a data packet having an originating IP address that is on the blacklist, the media relay will simply discard or ignore the data packets.

Because each port of a media relay is responsible for communicating data packets bearing the media of a single call, and because different ports therefore will be receiving data packets from different destination IP addresses, each blacklist may be specific to a single port of the media relay. In other words, a blacklist may specify the suspect originating IP addresses for a single port of a media relay. In other embodiments, a blacklist for a media relay may specify both the suspect originating IP addresses, and the ports to which those suspect originating IP addresses apply.

As explained above, when call setup signaling occurs, the media relay is informed of the port that will be used to communicate data packets bearing the media of a call. If a port of a media relay is unassigned, and should be idle, and that port receives a data packet for re-transmission, the media relay can assume that the data packet was improperly addressed, or that the data packet was sent by a hacker attempting to fraudulently use the idle port of the media relay. For this reason, a media relay embodying the invention is configured such that whenever an idle port of the media relay receives a data packet for re-transmission, the originating IP address of that data packet is added to the blacklist of the media relay. In some embodiments, the blacklisted originating IP address will apply to all ports of the media relay. In other embodiments, the blacklisted IP address will only apply to the idle port that received the data packet.

As explained above, in a media relay embodying the invention, it is possible for an active port to receive a data packet from an originating IP address that is different from the initial acceptable originating IP address set during call setup. The media relay will allow the acceptable originating IP address to change once after call setup, or after a REINVITE action has occurred. However, if the originating IP address for an active port has already changed one time, and the active port thereafter receives a data packet for re-transmission from a third originating IP address, the media relay can assume that the data packet was sent from a hacker attempting to fraudulently use the media relay. When this circumstance occurs, a media relay embodying the invention adds the originating IP address of that data packet to the blacklist of the media relay. Here again, in some embodiments the blacklisted originating IP address will apply to all ports of the media relay. In other embodiments, the blacklisted IP address will only apply to the active port that received the improperly addressed data packet.

Figure 6:
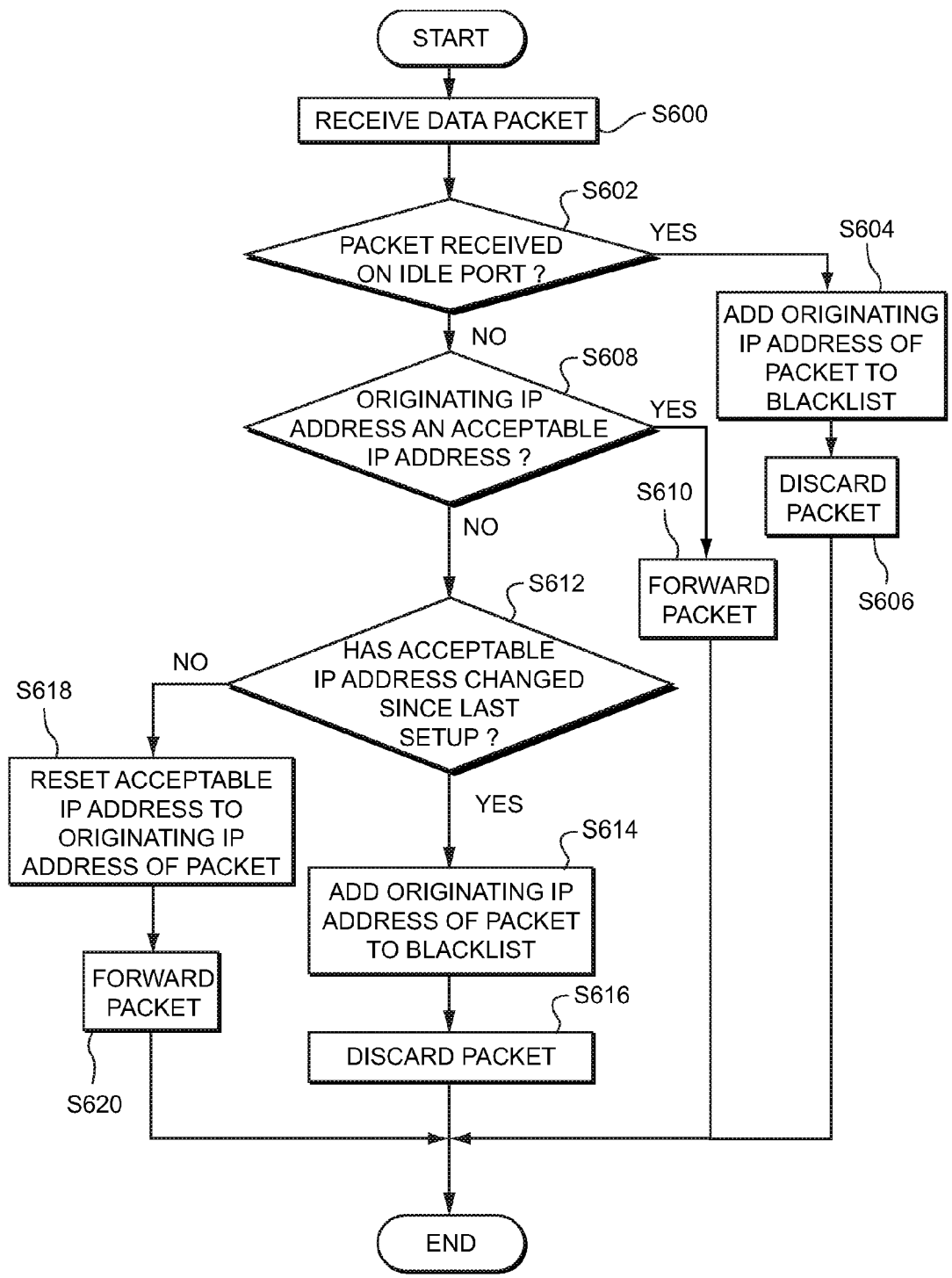
FIG. 6 is a flowchart illustrating steps of a second method embodying the invention.

FIG. 6 illustrates steps of a method embodying the invention which would be performed by a media relay embodying the invention, and which includes some types of blacklisting actions. The method begins in step S600, when a data packet is received by a media relay. In step S602, a check is performed to determine if the data packet has been received on an idle port of the media relay. If so, in step S604 the adding unit 412 of the blacklist maintenance unit 410 of the media relay adds the originating IP address of the received data packet to the blacklist. Then, in step S606, the packet is discarded.

If the check performed in step S602 indicates that the data packet was received by an active port of the media relay, the method proceeds to step S608, where a check is performed by the data packet handling unit 406 to determine if the originating IP address of the received data packet corresponds to an acceptable originating IP address. If so, the method proceeds to step S610, and the data packet handling unit 406 forwards the data packet to the appropriate destination.

If the check performed in S608 indicates that the originating IP address of the data packet does not correspond to an acceptable originating IP address, then the method proceeds to step S612, where a check is performed to determine if the acceptable originating IP address has changed since the call was setup, or since a REINVITE action occurred. If the acceptable originating IP address has already changed, this would indicate that the data packet has been received from a suspect originating IP address. As a result, the method proceeds to step S614, where the adding unit 412 of the blacklist maintenance unit 410 adds the originating IP address of the received data packet to the blacklist. The method then proceeds to step S616, where the data packet is discarded.

If the check performed in step S612 indicates that the acceptable originating IP address has not changed since the call was setup or since a REINVITE action occurred, the method proceeds to step S618 where the IP address setting unit 404 of the media relay re-sets the acceptable originating IP address to the originating IP address of the received data packet. The method then proceeds to step S620, where the data packet handling unit 406 forwards the data packet to the appropriate destination.

A method as discussed above can be used to update a blacklist being maintained for an entire media relay, or for individual ports of a media relay, to include the originating IP addresses of data packets that appear to have been sent by suspect entities.

There are other situations where it may be necessary to adjust the entries on a blacklist. One such situation can occur when a new call is first being established through a media relay.

Because of data packet transmission delays which can occur, it is possible for the call setup signaling sent from a proxy server to arrive at a media relay slightly after the first data packet bearing the media of a call arrives at the media relay. If this occurs, the data packet arrives at what the media relay believes is an unassigned and idle port. Because the data packet arrives at an unassigned/idle port, the media relay assumes the data packet was sent from a hacker attempting to fraudulently make use of the media relay. And, as described above, the media relay adds the originating IP address of the received data packet to the blacklist.

Immediately after the data packet arrives, and after the originating IP address of the data packet has been added to the blacklist, the call setup signaling arrives at the media relay. The call setup signaling indicates that the port has been assigned to a call, and the call setup signaling indicates that the originating IP address from which the data packet just arrived is actually a valid and acceptable originating IP address for that port. Under these circumstances, the media relay is configured so that the removal unit 414 of the blacklist maintenance unit 410 will remove the originating IP address specified in the call setup signaling from the blacklist. This will allow data packets bearing the media of the call that arrive after the call setup signaling to be processed normally.

In the foregoing descriptions, the media relay used to facilitate the communication of data packets bearing the media of a call was shown as part of the IP telephony system. In alternate embodiments, the media relay may be owned and operated by a third party, and the IP telephony system may simply make use of the media relay.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While foregoing is directed to embodiments of the present invention, other and further embodiments of the invention may be devised without departing from the basic scope thereof, and the scope thereof.

The invention claimed is:

1. A method of maintaining a blacklist of unacceptable originating IP addresses at a media relay, comprising:
   receiving a data packet at an idle port of a media relay;
   adding the originating IP address of the received data packet to the blacklist;
   receiving call setup signaling at the media relay after the data packet has been received and after the originating IP address of the data packet has been added to the blacklist, wherein the call setup signaling indicates that the media relay should expect to receive data packets bearing the media of an IP communication from the originating IP address of the received data packet; and
   removing the originating IP address of the received data packet from the blacklist in response to receipt of the call setup signaling when the call setup signaling is received immediately after the originating IP address of the received data packet was added to the blacklist.

2. The method of claim 1, wherein the blacklist of unacceptable originating IP addresses is specific to a particular port of the media relay.

3. A non-transitory computer readable medium having instructions stored thereon, which when executed by one or more processors of a media relay, cause the media relay to perform a method comprising:
   receiving a data packet at an idle port of a media relay;
   adding the originating IP address of the received data packet to the blacklist;
   receiving call setup signaling at the media relay after the data packet has been received and after the originating IP address of the data packet has been added to the blacklist, wherein the call setup signaling indicates that the media relay should expect to receive data packets bearing the media of an IP communication from the originating IP address of the received data packet; and
   removing the originating IP address of the received data packet from the blacklist in response to receipt of the call setup signaling when the call setup signaling is received immediately after the originating IP address of the received data packet was added to the blacklist.

4. The non-transitory computer readable medium of claim 3, wherein the instructions cause the media relay to add and remove originating IP addresses to a blacklist of unacceptable IP addresses that is specific to a particular port of the media relay.

5. A system for maintaining a blacklist of unacceptable originating IP addresses at a media relay, comprising:
   means for receiving a data packet at an idle port of a media relay;
   means for adding the originating IP address of the received data packet to the blacklist;
   means for receiving call setup signaling at the media relay after the data packet has been received and after the originating IP address of the data packet has been added to the blacklist, wherein the call setup signaling indicates that the media relay should expect to receive data packets bearing the media of an IP communication from the originating IP address of the received data packet; and
   means for removing the originating IP address of the received data packet from the blacklist in response to receipt of the call setup signaling when the call setup signaling is received immediately after the originating IP address of the received data packet was added to the blacklist.

6. A system that is part of a media relay and for maintaining a blacklist of unacceptable originating IP addresses at the media relay, comprising:
   a data packet handling unit that receives a data packet at an idle port of the media relay;
   an addition unit that adds the originating IP address of the received data packet to the blacklist;
   a communication setup unit that receives call setup signaling at the media relay after the data packet has been received and after the originating IP address of the received data packet has been added to the blacklist, wherein the call setup signaling indicates that the media relay should expect to receive data packets bearing the media of an IP communication from the originating IP address of the received data packet; and
   a removal unit that removes the originating IP address of the received data packet from the blacklist in response to receipt of the call setup signaling when the call setup signaling is received immediately after the originating IP address of the received data packet is added to the blacklist.

7. The system of claim 6, wherein the addition unit and the removal unit add and remove IP addresses from a blacklist of unacceptable IP addresses that is specific to a particular port of the media relay.

8. A method of processing data packets and maintaining a blacklist of unacceptable originating IP addresses at a media relay, comprising:
   receiving call setup signaling at the media relay that authorizes a first port of the media relay to process and forward data packets that are received from a first acceptable originating IP address;
   receiving a data packet at the first port of a media relay;
   determining when an originating IP address of the received data packet is an acceptable originating IP address;
   forwarding the received data packet when the originating IP address of the received data packet is an acceptable originating IP address;
   checking, when the originating IP address of the received data packet is not an acceptable originating IP address, to determine if the acceptable IP address for the first port has changed since the call setup signaling was received;
   resetting the acceptable originating IP address to a second acceptable originating IP address that is the originating IP address of the received data packet when the originating IP address of the received data packet is not an acceptable originating IP address and the acceptable originating IP address for the first port has not changed since the call setup signaling was received; and
   adding the originating IP address of the received data packet to a blacklist of unacceptable originating IP addresses and discarding the received data packet if the originating IP address of the received data packet is not an acceptable originating IP address and the acceptable originating IP address for the first port has already changed since the call setup signaling was received.

9. The method of claim 8, wherein the blacklist of unacceptable originating IP addresses is specific to the active port of the media relay.

10. A non-transitory computer readable medium having instructions stored thereon, which when executed by one or more processors of a media relay, cause the media relay to perform a method comprising:
   receiving call setup signaling at the media relay that authorizes a first port of the media relay to process and forward data packets that are received from a first acceptable originating IP address;
   receiving a data packet at the first port of a media relay;
   determining when an originating IP address of the received data packet is an acceptable originating IP address;
   forwarding the received data packet when the originating IP address of the received data packet is an acceptable originating IP address;
   checking, when the originating IP address of the received data packet is not an acceptable originating IP address, to determine if the acceptable IP address for the first port has changed since the call setup signaling was received;
   resetting the acceptable originating IP address to a second acceptable originating IP address that is the originating IP address of the received data packet when the originating IP address of the received data packet is not an acceptable originating IP address and the acceptable originating IP address for the first port has not changed since the call setup signaling was received; and
   adding the originating IP address of the received data packet to a blacklist of unacceptable originating IP addresses and discarding the received data packet if the originating IP address of the received data packet is not an acceptable originating IP address and the acceptable originating IP address for the first port has already changed since the call setup signaling was received.

11. The non-transitory computer readable medium of claim 10, wherein the instructions cause the media relay to add and remove originating IP addresses to a blacklist of unacceptable originating IP addresses that is specific to a particular port of the media relay.

12. A system that is part of a media relay and for maintaining a blacklist of unacceptable originating IP addresses at the media relay, comprising:
   a communication setup unit that receives call setup signaling at the media relay that authorizes a first port of the media relay to process and forward data packets that are received from a first acceptable originating IP address;
   a data packet handing unit that receives a data packet at the first port of a media relay, that determines when an originating IP address of the received data packet is an acceptable originating IP address, and that forwards the received data packet when the originating IP address of the received data packet is an acceptable originating IP address;

- a blacklist maintenance unit that checks, when the originating IP address of the received data packet is not an acceptable originating IP address, to determine if the acceptable IP address for the first port has changed since the call setup signaling was received;
- an IP address setting unit that resets the acceptable originating IP address to a second acceptable originating IP address that is the originating IP address of the received data packet when the originating IP address of the received data packet is not an acceptable originating IP address and the acceptable originating IP address for the first port has not changed since the call setup signaling was received;
- wherein the blacklist maintenance unit adds the originating IP address of the received data packet to a blacklist of unacceptable originating IP addresses when the originating IP address of the received data packet is not an acceptable originating IP address and the acceptable originating IP address for the first port has already changed since the call setup signaling was received; and
- wherein the data packet handing unit discards the received data packet when the originating IP address of the received data packet is not an acceptable originating IP address and the acceptable originating IP address for the first port has already changed since the call setup signaling was received.

13. The system of claim 12, wherein the addition unit and the removal unit add and remove IP addresses from a blacklist of unacceptable IP addresses that is specific to a particular port of the media relay.

* * * * *

UNITED STATES PATENT AND TRADEMARK OFFICE
CERTIFICATE OF CORRECTION

| | | |
|---|---|---|
| PATENT NO. | : 9,001,699 B2 | Page 1 of 1 |
| APPLICATION NO. | : 13/337212 | |
| DATED | : April 7, 2015 | |
| INVENTOR(S) | : Meghani et al. | |

It is certified that error appears in the above-identified patent and that said Letters Patent is hereby corrected as shown below:

On the title page, add the following:

--(73) Assignee: Vonage Network, LLC, Holmdel, NJ--.

Signed and Sealed this
Seventeenth Day of May, 2016

Michelle K. Lee
*Director of the United States Patent and Trademark Office*